(12) United States Patent
Pliefke et al.

(10) Patent No.: US 10,493,917 B2
(45) Date of Patent: *Dec. 3, 2019

(54) VEHICULAR TRAILER BACKUP ASSIST SYSTEM

(71) Applicant: MAGNA ELECTRONICS INC., Auburn Hills, MI (US)

(72) Inventors: Sebastian Pliefke, Sailauf (DE); Horst D. Diessner, Rochester Hills, MI (US); Christian Weber, Karlsbad (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,069

(22) Filed: Dec. 20, 2018

(65) Prior Publication Data

US 2019/0143895 A1    May 16, 2019

Related U.S. Application Data

(63) Continuation of application No. 14/613,441, filed on Feb. 4, 2015, now Pat. No. 10,160,382.

(60) Provisional application No. 61/972,708, filed on Mar. 31, 2014, provisional application No. 61/935,485, filed on Feb. 4, 2014.

(51) Int. Cl.
| | | |
|---|---|---|
| *B60R 1/00* | (2006.01) | |
| *H04N 7/18* | (2006.01) | |
| *B62D 13/06* | (2006.01) | |
| *B62D 15/02* | (2006.01) | |
| *B60D 1/24* | (2006.01) | |
| *B60D 1/62* | (2006.01) | |

(52) U.S. Cl.
CPC ............. *B60R 1/00* (2013.01); *B60D 1/245* (2013.01); *B60D 1/62* (2013.01); *B62D 13/06* (2013.01); *B62D 15/027* (2013.01); *H04N 7/183* (2013.01); *B60R 2300/808* (2013.01)

(58) Field of Classification Search
CPC ........ B60R 1/00; H04N 7/183; B62D 15/027; B62D 13/06; B60D 1/62
USPC ....................................................... 348/118
See application file for complete search history.

(56) References Cited

U.S. PATENT DOCUMENTS

| | | |
|---|---|---|
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |

(Continued)

*Primary Examiner* — On S Mung
(74) *Attorney, Agent, or Firm* — Honigman LLP

(57) ABSTRACT

A vehicular trailer backup assist system is operable to steer a vehicle, with a trailer connected at the rear of the vehicle, during a reversing maneuver of the vehicle and trailer. The system electronically overlays a plurality of zones over displayed video images, with each individual zone of the overlayed plurality of zones being indicative of a respective individual region rearward of the vehicle and trailer. Responsive to a selected zone of travel for the trailer, the control controls steering of the vehicle to steer the vehicle to guide the trailer towards the respective individual region that is encompassed by the selected zone of travel during reversing of the vehicle and trailer. The driver of the vehicle manually adjusts steering of the vehicle to more accurately steer the vehicle towards a target location within the respective individual region that is encompassed by the selected zone of travel.

20 Claims, 14 Drawing Sheets

(56) References Cited

U.S. PATENT DOCUMENTS

| | | |
|---|---|---|
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,937,796 A | 6/1990 | Tendler |
| 4,953,305 A | 9/1990 | Van Lente et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi et al. |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |

(56) References Cited

U.S. PATENT DOCUMENTS

| | | |
|---|---|---|
| 5,535,314 A | 7/1996 | Alves et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,990,649 A | 11/1999 | Nagao et al. |
| 6,009,336 A | 12/1999 | Harris et al. |
| 6,020,704 A | 2/2000 | Buschur |
| 6,084,519 A | 7/2000 | Coulling et al. |
| 6,097,023 A | 8/2000 | Schofield et al. |
| 6,116,743 A | 9/2000 | Hoek |
| 6,144,022 A | 11/2000 | Tenenbaum et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,222,447 B1 | 4/2001 | Schofield et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,430,303 B1 | 8/2002 | Naoi et al. |
| 6,433,817 B1 | 8/2002 | Guerra |
| 6,442,465 B2 | 8/2002 | Breed et al. |
| 6,480,104 B1 | 11/2002 | Wall et al. |
| 6,483,429 B1 | 11/2002 | Yasui et al. |
| 6,497,503 B1 | 12/2002 | Dassanayake et al. |
| 6,498,620 B2 | 12/2002 | Schofield et al. |
| 6,523,964 B2 | 2/2003 | Schofield et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,721,659 B2 | 4/2004 | Stopczynski |
| 6,735,506 B2 | 5/2004 | Breed et al. |
| 6,744,353 B2 | 6/2004 | Sjönell |
| 6,762,867 B2 | 7/2004 | Lippert et al. |
| 6,795,221 B1 | 9/2004 | Urey |
| 6,802,617 B2 | 10/2004 | Schofield et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,975,775 B2 | 12/2005 | Rykowski et al. |
| 7,004,606 B2 | 2/2006 | Schofield |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,158,015 B2 | 1/2007 | Rao et al. |
| 7,202,776 B2 | 4/2007 | Breed |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,425,076 B2 | 9/2008 | Schofield et al. |

(56) References Cited

U.S. PATENT DOCUMENTS

| | | |
|---|---|---|
| 7,432,248 B2 | 9/2008 | Schofield et al. |
| 7,459,664 B2 | 12/2008 | Schofield et al. |
| 7,483,058 B1 | 1/2009 | Frank et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,616,781 B2 | 11/2009 | Schofield et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri |
| 7,930,160 B1 | 4/2011 | Hosagrahara et al. |
| 8,010,252 B2 | 8/2011 | Getman et al. |
| 8,017,898 B2 | 9/2011 | Lu et al. |
| 8,063,752 B2 | 11/2011 | Oleg |
| 8,094,170 B2 | 1/2012 | Kato et al. |
| 8,098,142 B2 | 1/2012 | Schofield et al. |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert et al. |
| 8,411,998 B2 | 4/2013 | Huggett et al. |
| 9,085,261 B2 | 7/2015 | Lu et al. |
| 9,495,876 B2 | 11/2016 | Lu et al. |
| 1,016,038 A1 | 12/2018 | Pliefke et al. |
| 2001/0001563 A1 | 5/2001 | Tomaszewski |
| 2002/0113873 A1 | 8/2002 | Williams |
| 2003/0137586 A1 | 7/2003 | Lewellen |
| 2003/0210807 A1 | 11/2003 | Sato |
| 2003/0222982 A1 | 12/2003 | Hamdan et al. |
| 2005/0000738 A1 | 1/2005 | Gehring et al. |
| 2005/0237385 A1 | 10/2005 | Kosaka et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0147321 A1 | 6/2008 | Howard et al. |
| 2008/0231701 A1 | 9/2008 | Greenwood et al. |
| 2009/0113509 A1 | 4/2009 | Tseng et al. |
| 2009/0143967 A1 | 6/2009 | Lee et al. |
| 2012/0045112 A1 | 2/2012 | Lundblad et al. |
| 2012/0200706 A1 | 8/2012 | Greenwood et al. |
| 2012/0265416 A1 | 10/2012 | Lu et al. |
| 2013/0158863 A1 | 6/2013 | Skvarce et al. |
| 2014/0085472 A1 | 3/2014 | Lu et al. |
| 2014/0160276 A1 | 6/2014 | Pliefke et al. |
| 2014/0343793 A1 | 11/2014 | Lavoie et al. |
| 2015/0002670 A1 | 1/2015 | Bajpai |
| 2015/0217693 A1 | 8/2015 | Pliefke et al. |

VEHICULAR TRAILER BACKUP ASSIST SYSTEM

CROSS REFERENCE TO RELATED APPLICATIONS

The present application is a continuation of U.S. patent application Ser. No. 14/613,441, filed Feb. 4, 2015, now U.S. Pat. No. 10,160,382, which claims the filing benefits of U.S. provisional applications, Ser. No. 61/972,708, filed Mar. 31, 2014, and Ser. No. 61/935,485, filed Feb. 4, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vision system that utilizes one or more cameras or image sensors to capture image data of a scene exterior (such as forwardly) of a vehicle and provides a display of images indicative of or representative of the captured image data.

The vehicular vision system or trailer backup assist system of the present invention includes at least one camera disposed at a vehicle and having an exterior field of view rearward of the vehicle. The camera is operable to capture image data. An image processor operable to process captured image data. Responsive to image processing of captured image data, the system is operable to determine a trailer angle of a trailer that is towed by the vehicle. The system is responsive to the determined trailer angle and to a user input (that indicates a desired or selected path of the trailer) to adjust or control the steering of the vehicle to guide the trailer along the selected path. The system steers the vehicle to guide or backup the trailer in a direction that generally corresponds to the selected path or direction, and that is within a selected zone or range of angles or directions rearward of the vehicle. The driver of the vehicle may manually adjust the steering of the vehicle to more accurately or precisely steer the vehicle in the desired direction, with the system steering the vehicle generally in the desired direction so that only minor or slight adjustments of vehicle steering may be needed or provided by the driver of the vehicle.

These and other objects, advantages, purposes and features of the present invention will become apparent upon review of the following specification in conjunction with the drawings.

BRIEF DESCRIPTION OF THE DRAWINGS

FIGS. 5A-11A are perspective views of a trailer at different degrees of turning relative to the towing vehicle;

FIGS. 5B-11B are top plan views showing the target at the trailer of FIGS. 5A-11A, respectively;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1A:
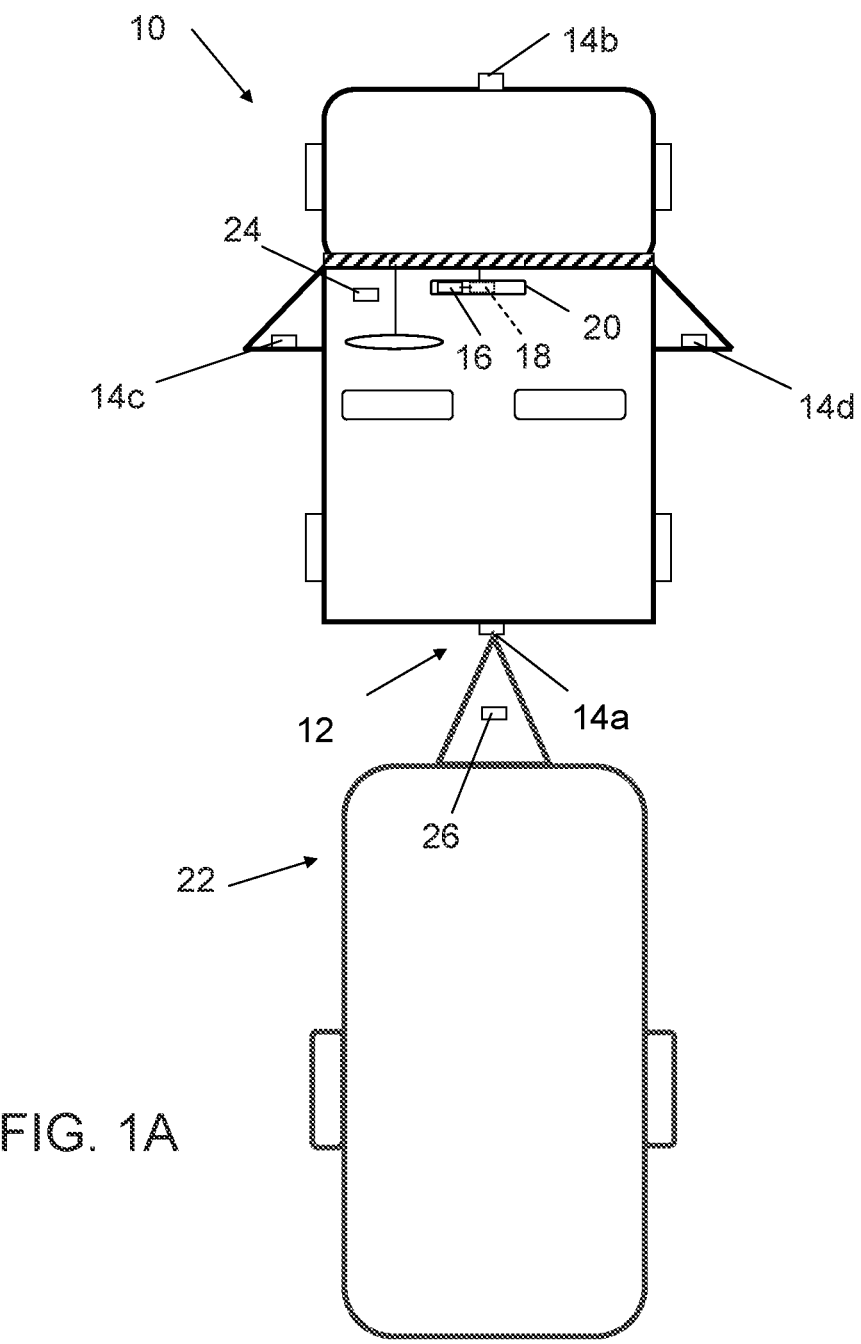
FIG. 1A is a plan view of a vehicle with a vision system that incorporates a camera and trailer backup assist system in accordance with the present invention.
Figure 1B:
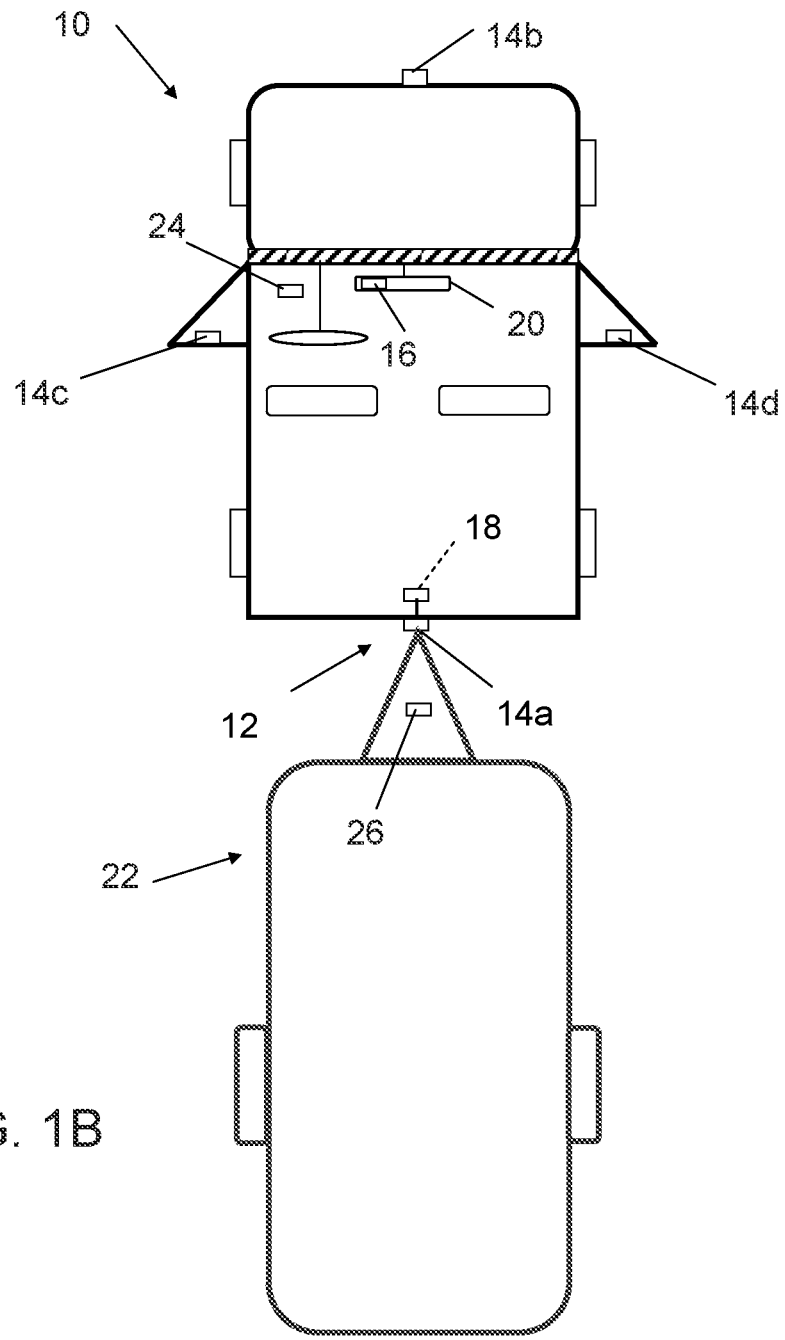
FIG. 1B is a plan view of a vehicle with another vision system that incorporates a camera and trailer backup assist system in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1A). The vision system 12 includes a control or electronic control unit (ECU) or processor 18 that is operable to process image data captured by the cameras and may provide displayed images at a display device 16 for viewing by the driver of the vehicle (although shown in FIG. 1A as being part of or incorporated in or at an interior rearview mirror assembly 20 of the vehicle, the control 18 and/or the display device may be disposed elsewhere at or in the vehicle). For example, and such as shown in FIG. 1B, the control may be close to or attached at or incorporated in a camera, such as the rear viewing camera 14a. The data transfer or signal communication from the camera to the ECU may comprise any suitable data or communication link, such as a vehicle network bus or the like of the equipped vehicle.

Driver assistant systems made to assist the driver when pulling or pushing a trailer without having a specific trailer angle sensor are described in International Publication No. WO 2012/103193, published Aug. 2, 2012, which is hereby incorporated herein by reference in its entirety. Such trailer angle sensing systems may detect the trailer nicking angle (relative to the vehicle) by determining the location and/or angle of targets on the trailer via image processing of image data captured by the vision system's rearward viewing camera or cameras. In some systems, when attaching a trailer to the vehicle, the driver has to enter its properties to put the trailer driving aid system into a position to calculate the driving aids overlays properly, when backing up with the trailer attached. Such measurements and entries would need to be done for each different trailer that is connected to the vehicle.

Figure 2:
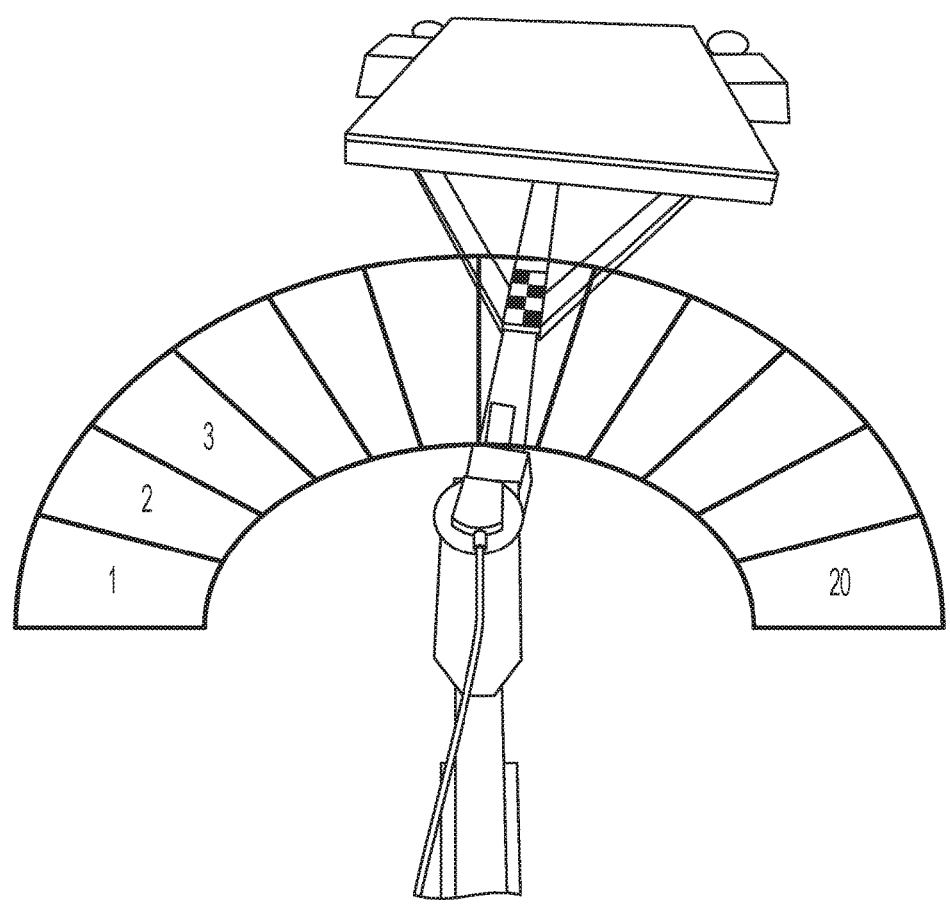
FIG. 2 is a perspective view and illustration of different angles of the trailer relative to the vehicle that the system may determine during operation of the vehicle and trailer backup assist system of the present invention.
Figure 3:
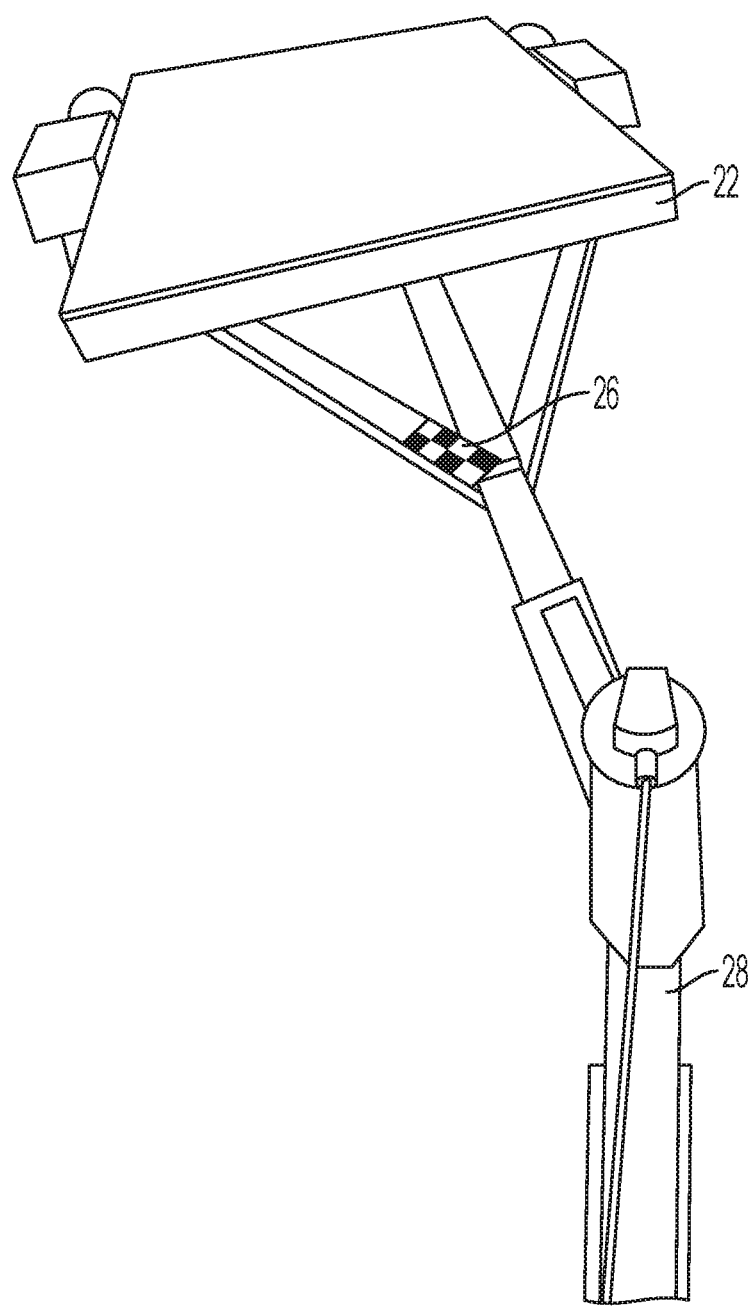
FIG. 3 is a perspective view of a trailer being pulled by a vehicle with a target at the trailer.
Figure 4:
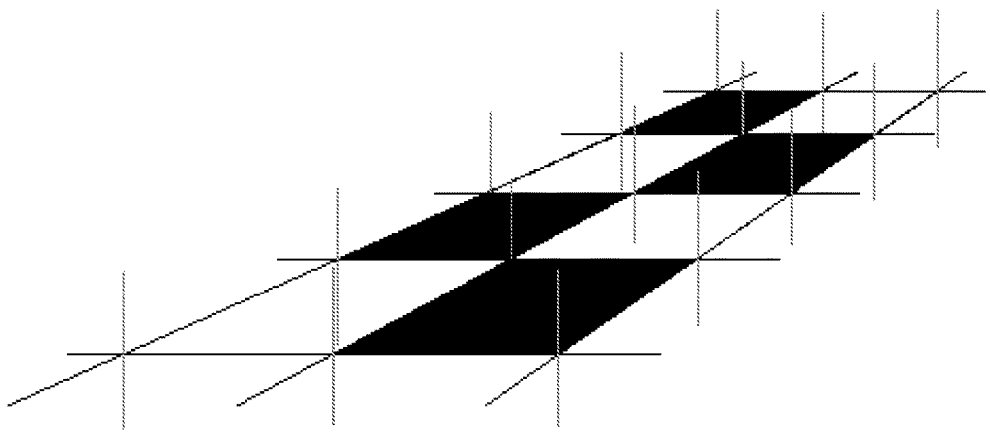
FIG. 4 is a view of the target as viewed by the camera when the trailer is turned relative to the vehicle.
Figure 5A:
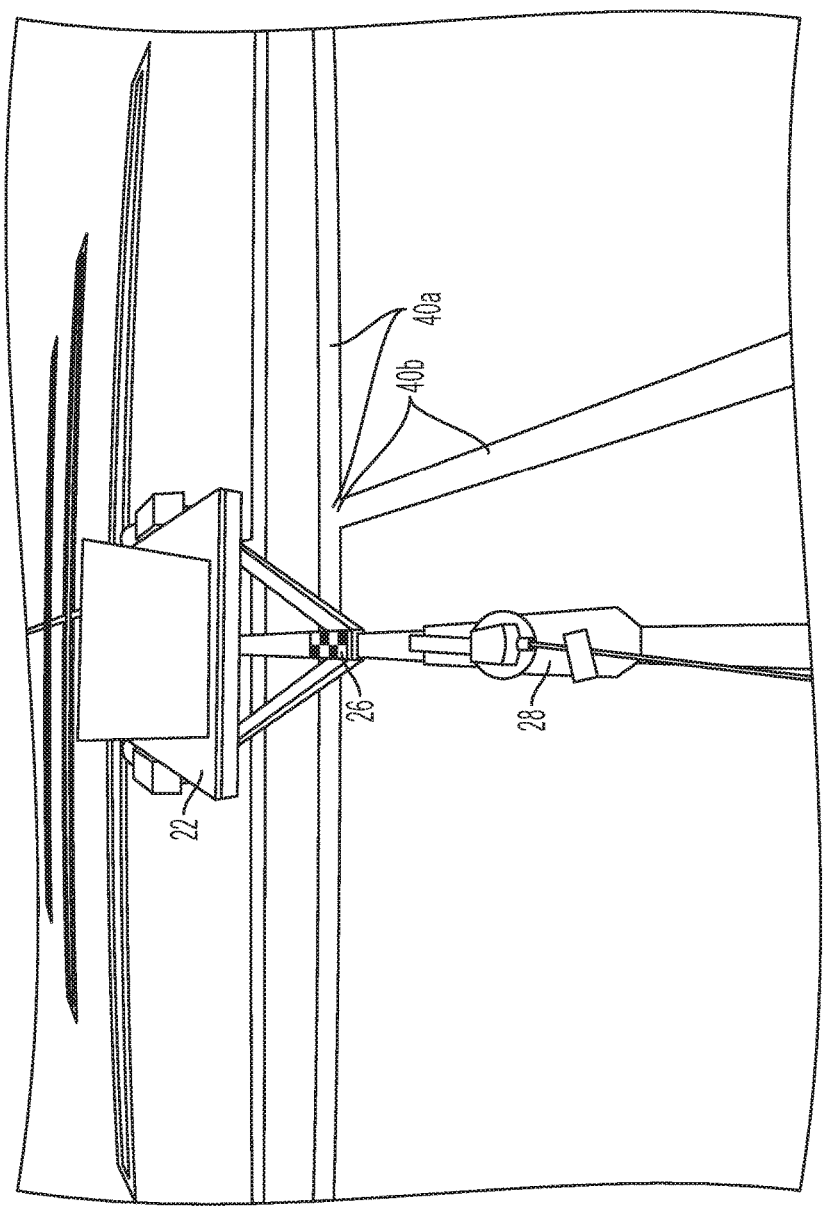
Figure 5B:
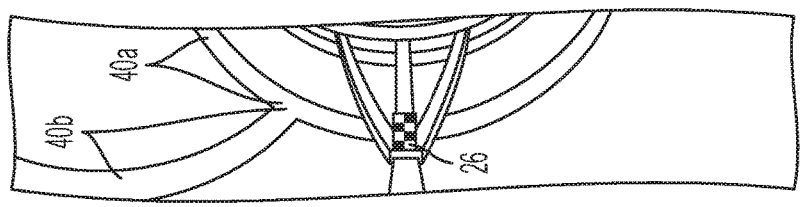
Figures 6A, 6B:
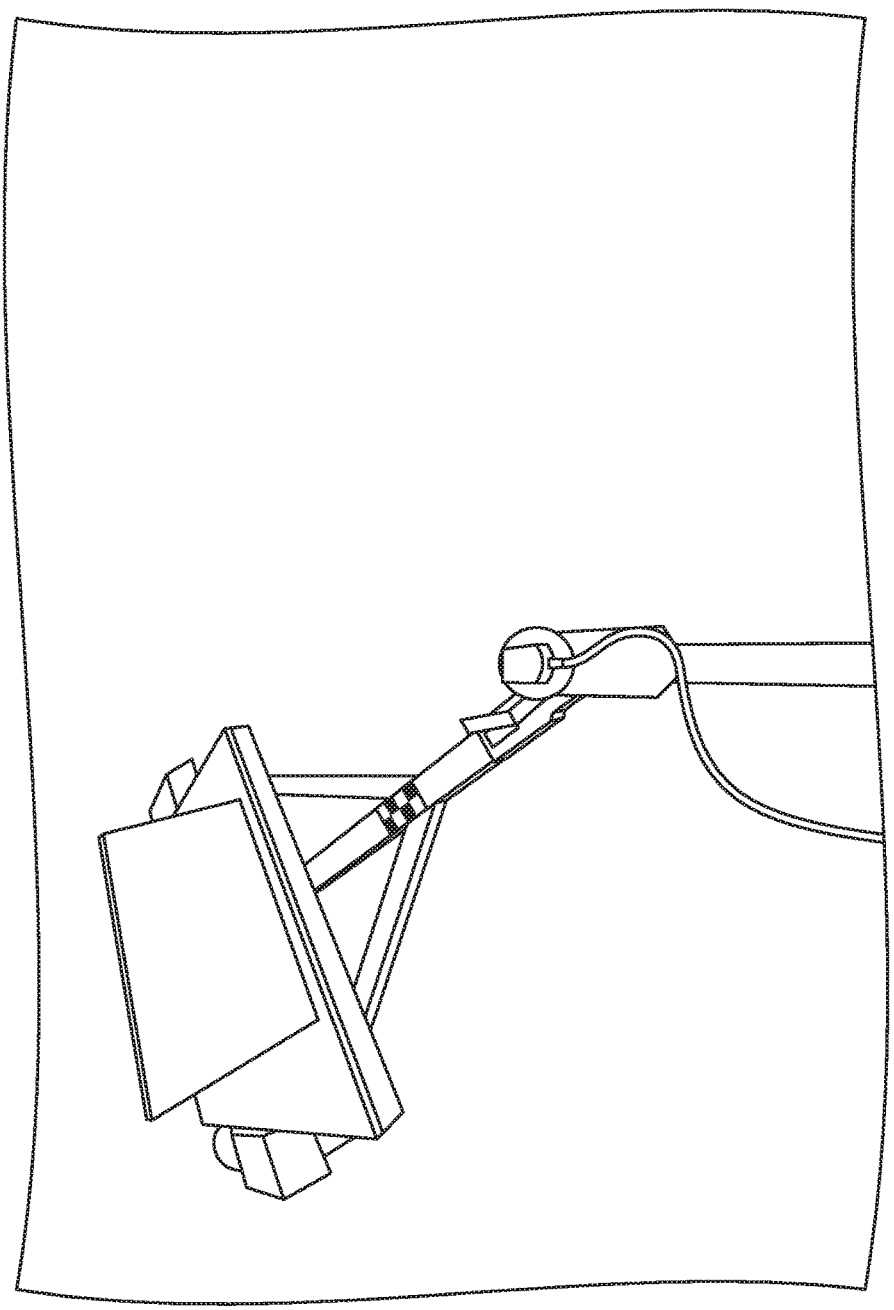
Figure 7B:
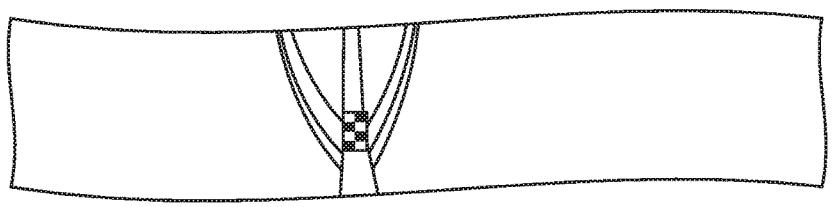
Figure 7A:
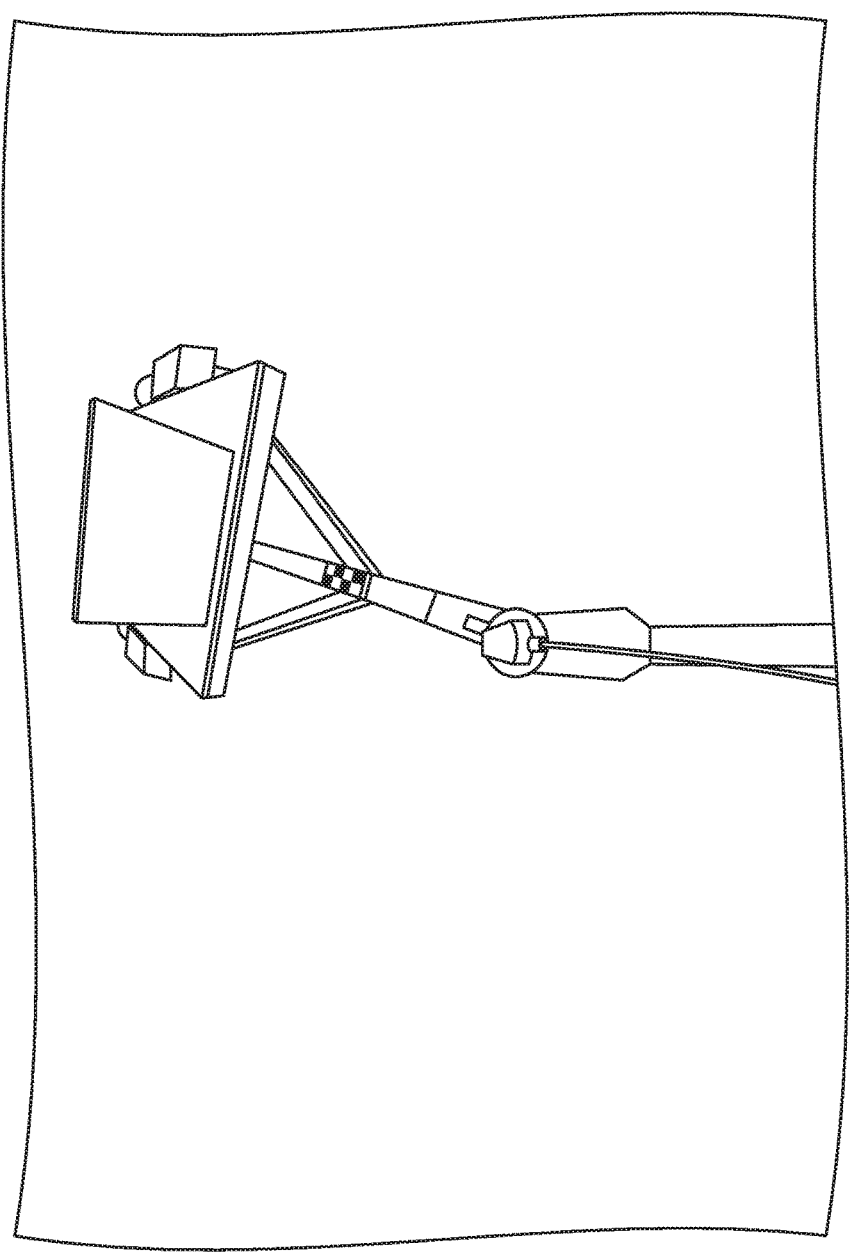
Figures 8A, 8B:
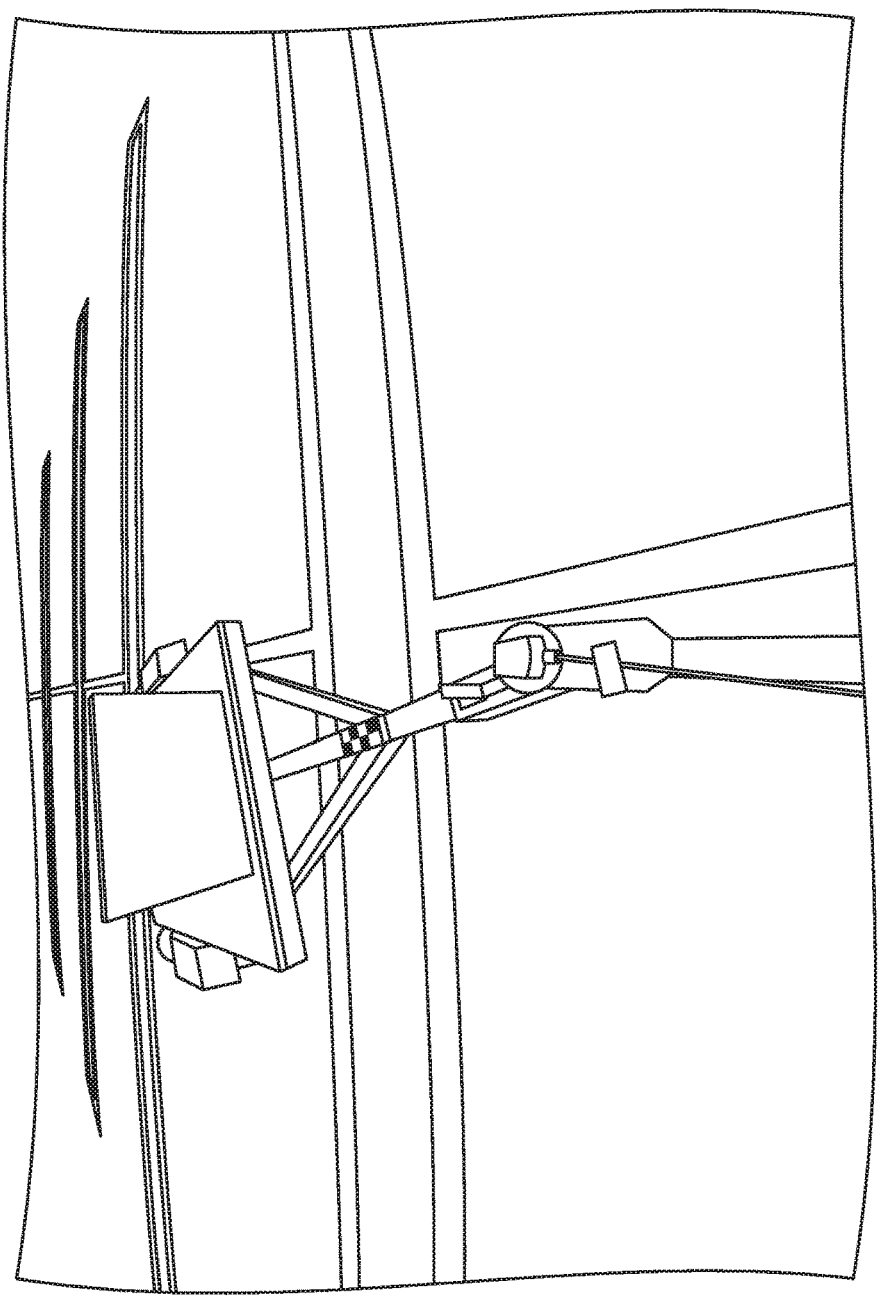
Figure 9B:
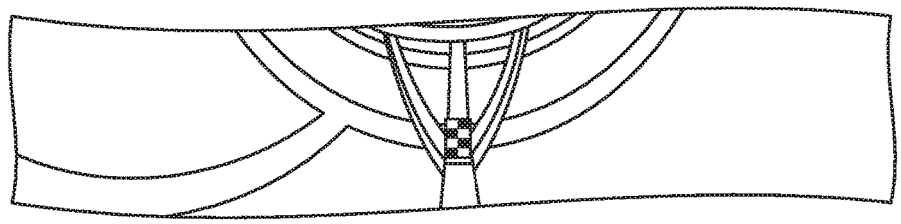
Figure 9A:
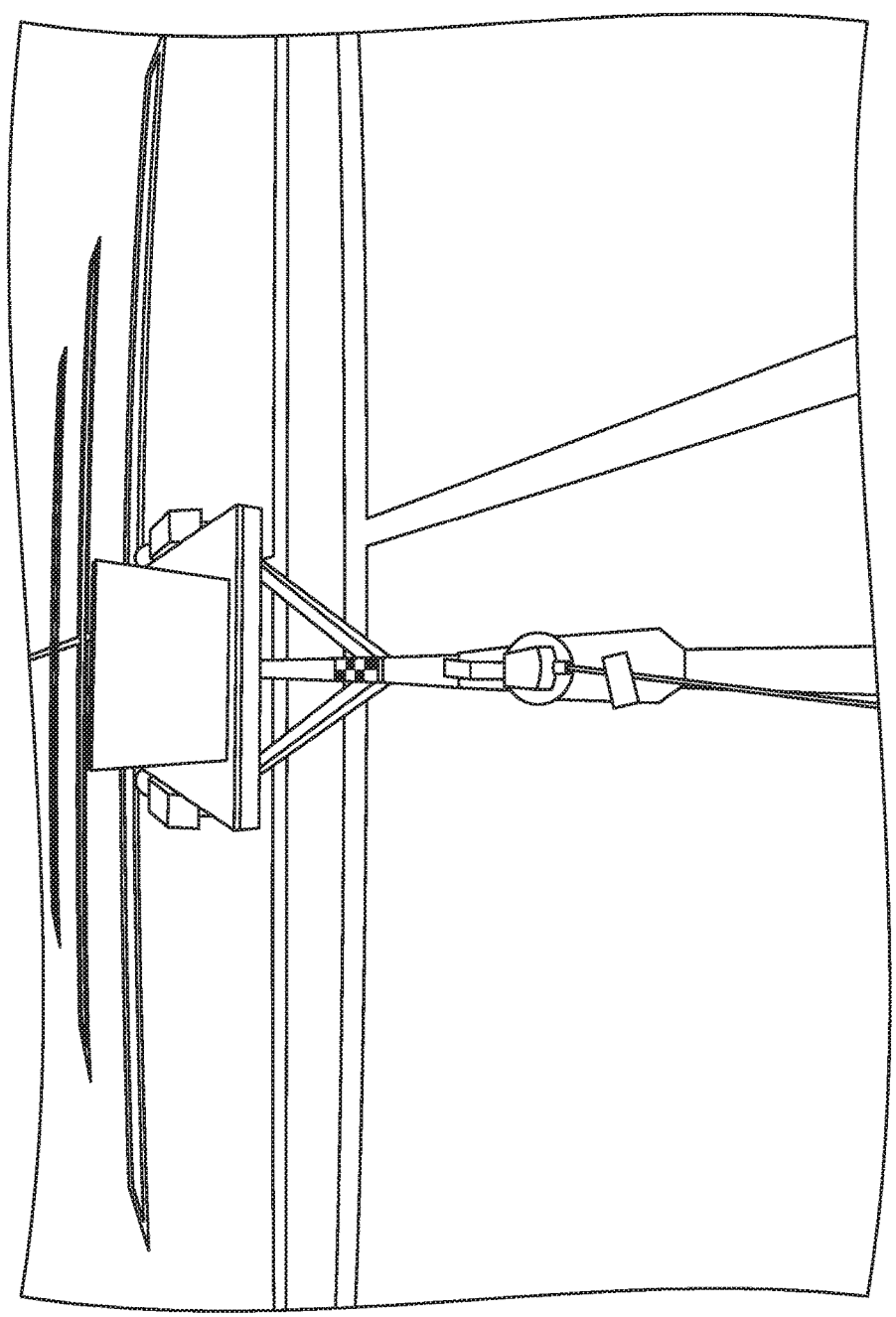
Figure 10B:
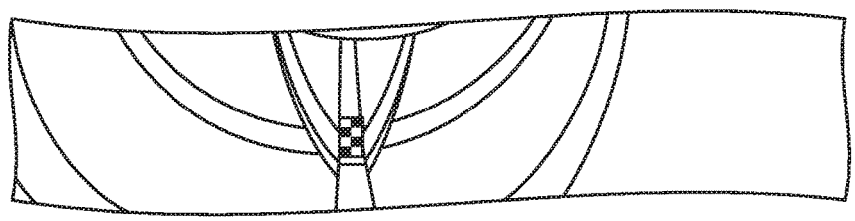
Figure 10A:
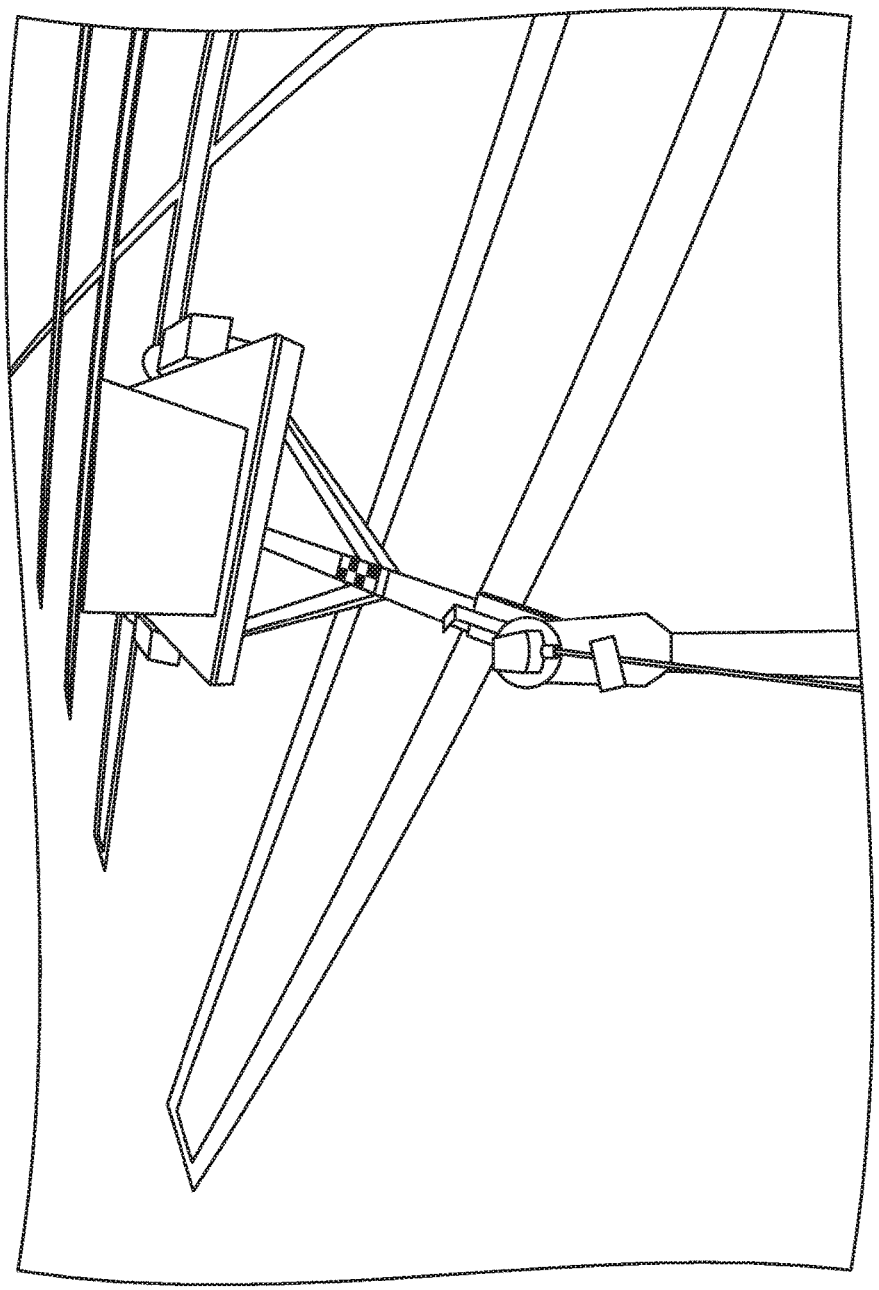
Figure 11B:
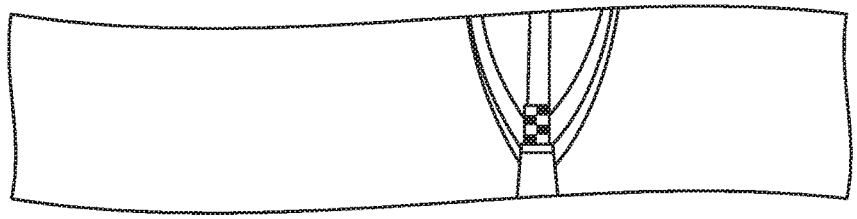
Figure 11A:
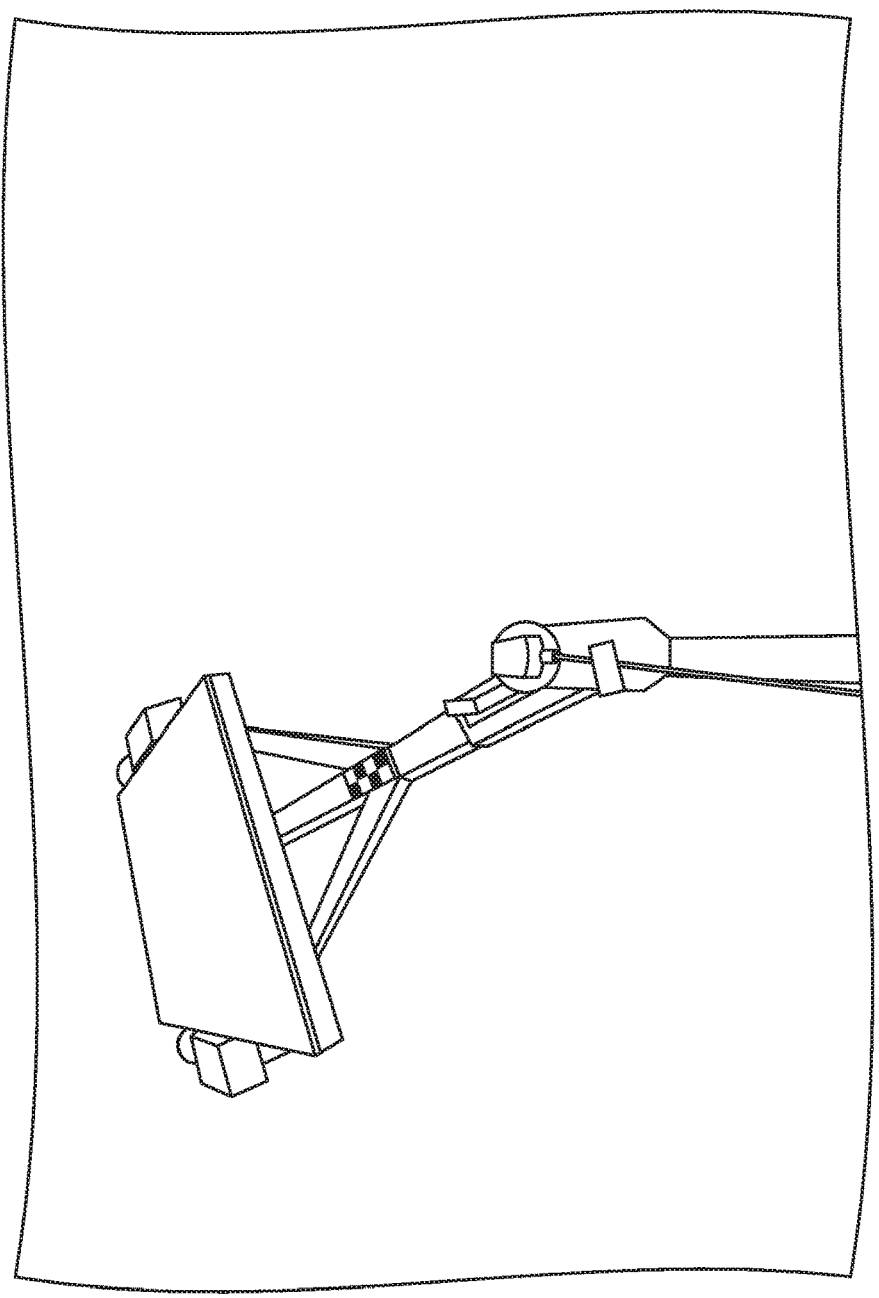

The present invention provides a trailer backup assist system that assists the driver of the vehicle 10 when reversing the vehicle with a trailer 22 connected thereto (FIGS. 1A, 1B and 2). The system is responsive a user input 24 that, responsive to adjustment or selection or setting of the input by the user or driver of the vehicle, sets or establishes a rearward direction or path for the trailer to travel along (such as via a steering knob or dial that "steers" the trailer along its rearward path). The system determines the angle of the trailer relative to the vehicle (such as via image processing of image data captured by the rear camera 14a of the vehicle, which may include determination of a location of a target 26 on the trailer) and, responsive to the determined angle and responsive to the user input (which may set or establish a selected location or zone of the target 26 on the trailer to set a selected or desired direction of travel of the trailer), the system adjusts or controls the steering of the vehicle to generally follow the selected path of the trailer to assist the driver in reversing the vehicle and trailer.

For example, if zone 3 were selected (in FIG. 2), the system would steer the vehicle and trailer (during a reversing maneuver) to guide the trailer towards a region (such as towards the region or area occupied by the vehicle shown in FIG. 2) that is encompassed by the selected zone, and may adjust the vehicle steering to guide and maintain the trailer travel direction towards the determined region or regions encompassed by the selected zone. The driver then may only have to slightly adjust the steering of the vehicle as the vehicle and trailer are reversing to more accurately steer the trailer to the desired location. The system may utilize aspects of the systems described in U.S. patent application Ser. No. 14/102,981, filed Dec. 11, 2013, now U.S. Pat. No. 9,558,419; Ser. No. 14/036,723, filed Sep. 25, 2013, now U.S. Pat. No. 9,446,713, and/or Ser. No. 13/979,871, filed Jul. 16, 2013, now U.S. Pat. No. 9,085,261, which are hereby incorporated herein by reference in their entireties.

The present invention thus may simplify customer interaction and human machine interface (HMI) during setup of the system, with a goal to eliminate user measurements during system and/or trailer setup. The system is operable to modify the trailer backup assist (TBA) system steering algorithm in order to accommodate detection or measurement error from the trailer angle detection (TAD) sensor or system. The system may provide steering control of the vehicle that results in the trailer being pushed or driven generally in the selected or desired rearward direction, whereby the driver may use the steering wheel of the vehicle or the user input to further adjust or refine the steering direction to further control or guide the trailer in a more precise desired or selected direction. The system of the present invention thus provides a simplified steering algorithm for controlling the vehicle steering, and does not require the detailed measurements during set up of the system on a vehicle with a trailer connected thereto.

The system of the present invention changes the assist system feature approach from absolute trailer steering (such as an attempt to drive any trailer on a defined trajectory or curve radius using knob utilizing measurements of the vehicle and trailer in an attempt to more accurately or precisely know where the trailer will be for any given vehicle steering adjustment) to relative trailer steering (where the system may steer the vehicle to generally position or guide the trailer towards a desired or selected direction of travel). This would move the control more to the driver of the vehicle, who may provide a finer adjustment of the steering of the vehicle as the vehicle and trailer are reversed.

The system reduces or eliminates user measurements for TAD, and may provide a display box as an overlay on the display screen (in the vehicle) and may instruct the user to move the trailer to place the trailer target inside the box overlay. The TAD sensor then may output the zone in which the trailer is located. For example, and such as shown in FIG. 2, the trailer target (such as at or on the tongue of the trailer) is located at one of the center regions or zones of the overlay. The number of zones may vary depending on the particular application of the system. For example, the overlay may provide 20 zones over roughly 180 degrees wide angle field of view, such that each zone sweeps or encompasses about nine degrees or thereabouts.

The zone indicates in which general direction (or angle or ranges of angles relative to the vehicle) the trailer is moving. Because the user measurements are removed, an angle measurement is not needed, and nevertheless the TAD allows detection of the direction in which the trailer is moving. The detected or determined or reported zone may not be the same for two different trailer setups if the trailers have the same trailer angle, but since the steering is relative, the impact is minimized.

The trailer backup assist system user input range or steering knob range may be divided into zones. The requested zone on the knob is mapped to the reported zones of the TAD sensor. The steering algorithm attempts to steer the trailer so that the selected angle of the knob matches the zone of the TAD. The TAD zone at zero degrees can still be identified using the zero offset calibration, and the zones can be centered around zero degrees (or straight behind the vehicle).

Due to variations in vehicles and steering systems and trailers, the same knob angle may result in a different curve radius for different trailers. This can be compared with different vehicles. Different vehicles drive on a different curve radius when the steering wheel angle is the same depending on the vehicle wheel base and steering rack parameters and the like.

The trailer backup assist (TBA) system may not be able to steer the trailer exactly at zero degrees. The driver may have to correct the steering if the trailer drifts slightly off to one side. This may be compared to driving a vehicle on a road which slightly leans to one side. The steering wheel has to be put on an angle to drive straight. Thus, the driver input or steering adjustment is small and is not different from small adjustments that drivers typically have to do during normal driving conditions.

Thus, the present invention will decrease setup complexity for trailer backup assist systems, and will allow for less accuracy from the TAD sensor but may receive more control input from the driver. The system of the present invention thus actively controls the vehicle and trailer during a reversing maneuver. The rear camera and image processor determine the target and the angle of trailer relative to the tow vehicle and an output is generated indicative of that angle. The system of the present invention adjusts the vehicle steering for the particular trailer and vehicle configuration and for the selected direction of travel of the vehicle and trailer. Because the system does not require the complicated measurements at the time of setup, the system is simplified and provides a simplified steering input to the vehicle. The driver selects the segment or zone that corresponds to the desired direction of travel of the vehicle and trailer and the system generally steers the trailer toward that direction. During the reversing maneuver, the driver can then override or adjust or slightly adjust or refine the vehicle steering (such as via the vehicle steering wheel or the user input or dial) to steer the trailer more accurately in the selected direction or towards the target location (such as a selected boat launch ramp or parking space or garage stall or loading/unloading station or the like). The system operates to guide or steer the trailer close to the desired direction of travel (within the selected zone or region or general direction or range of angles) and the driver may then adjust the steering accordingly as the trailer is moved rearwardly in that general direction. The steering algorithm of the control is thus simplified and the system provides a trailer backup assist that can be implemented on a wide range of vehicles and trailers without complex setup measurements and processes.

Both when using a TBA system as described above with decreased setup complexity, or when using a system without and when using target based to TDA algorithm, the finding of the trailer target by image processing (of image data captured by a rear camera of the vehicle) in the rear image is important. This is not always a trivial problem. Typically, these targets should be as small as about 2 square inches. Due to the wide angle lens and because the rear camera is typically equipped with low resolution imagers such as 1.2 MP and about 180 degree fisheye lens cameras, the checkerboard target 26 such as shown in FIGS. 3-13 is captured by just about 10×20 pixels. Typically, the rear vehicle scene is mostly illuminated by scattered light, shattered light, stray light or brindle (such as to be seen in exemplary FIGS. 11A and 11B) or the background itself is brindle such as at times when the ground is covered with leaves. For having a vehicle trailer angle detection target 26 with minimal auto correlation and rotation invariance, a Baker target may be used, such as described in U.S. patent application Ser. No. 14/102,981, filed Dec. 11, 2013, now U.S. Pat. No. 9,558,409, which is hereby incorporated herein by reference in its entirety. Due to the limited target size, the resolution may be less for using a Baker target. Because of that, less sophisticated targets with conventional patterns such as black and white chessboard pattern may find use, such as shown in the exemplary cases in the FIGS. 3-13 and especially in FIG. 4. When using cameras with higher resolution or bigger targets, the use of Baker targets instead of chessboard targets may be preferred.

Algorithms for finding target patterns within camera views such as rear camera fisheye views or demorphed rear camera views typically check the whole image or check the image portion which is below the horizon or may check a limited region of interest, for finding the target pattern. Since the trailer 22 turns around a turning point at the hitch 28 head, the target turns with the trailer. Because the viewing angle from the camera to the target is comparably flat, the checkerboard squares appear as rhombs in a two dimensional (2D) camera image due to the perspective when the target is turned against the camera view (see FIG. 4). As can be seen in FIG. 2, a trailer target fixedly attached to a trailer turns radially around the turning point of the hitch head with the vehicle. When the trailer-vehicle train stands on a balled surface, the target turns a little downwardly, when the trailer-vehicle train stands in a sink, the target turns a little upwardly within the camera view, but the turning radius stays substantially curved (arch-shaped area).

Figure 12:
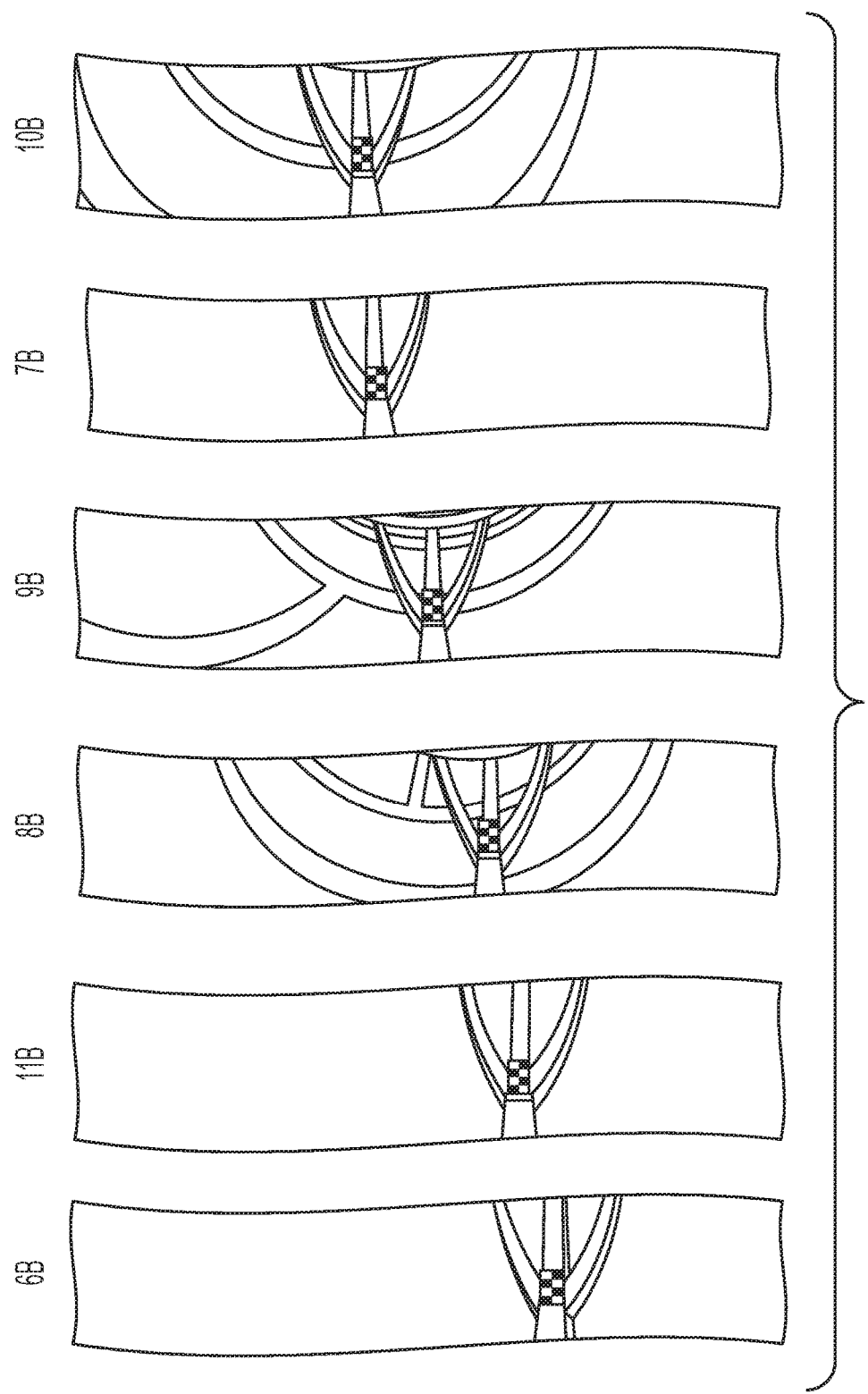
FIG. 12 shows the plan views of FIGS. 6B, 11B, 8B, 9B, 7B and 10B side by side.

As an aspect of the present invention, the system may execute a few transformations of just the area the trailer target can possibly be located (the arch-shaped area) plus a small tolerance area. The few transformations may be of a nature that the substantially curved area (arch-shaped area) may be bent (transformed) to a string shape area such as 'parallel projection'-transformation. That kind of view transformation is different to known art view point transformation, such as top view (or top down or bird's eye or surround view) transformation. Straight lines become curved and curved lines may straighten, compare the two straight (real scene) lane markings 40a and 40b in the demorphed fisheye view of FIG. 5A to the target turning curve (arch-shaped) area parallel projection transformed view of FIG. 5B. FIGS. 6A-11A show more scenes with the trailer hooked onto the hitch in different turning angles. FIGS. 6B-11B show the relating views transformed views of the target area according the invention. In FIG. 12, the FIGS. 6B-11B are arranged side by side depending on the turning angle. Starting from the left (FIG. 6B), with the trailer is turned to the right, to the very right (FIG. 10B) with the trailer turned to the left (related to the vehicle's middle axis (x-dimension)).

As can be seen with reference to FIG. 12, the benefit of the suggested view transformation and pattern search area becomes clear. The pattern is always orientated in the same way, but shifted sideward within the view area. By using such transformed views, a pattern search and compare algorithm can easily find the target's position within the view, which can directly be set into relation to the trailer's turning angle.

Figure 13:
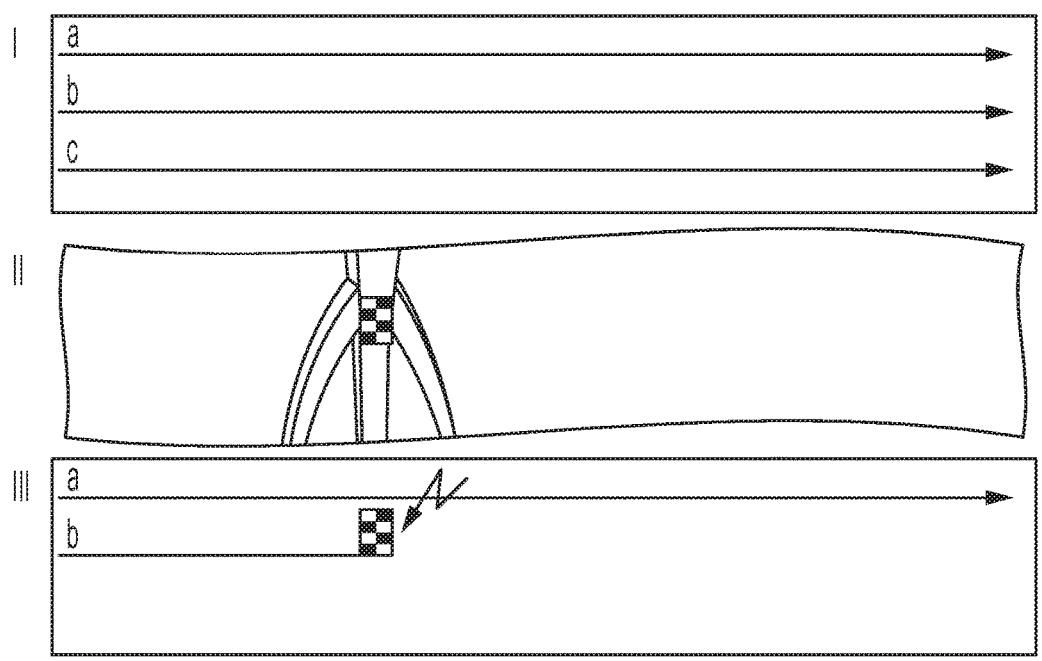
FIG. 13 is a schematic showing operation of a search algorithm of the present invention.

A typical pattern search method is convolution. A 1×10 convolution may find use here. The search may run over the search area from left to right in lines such as shown in the example in FIG. 13 (at I). In there the convolution search may run through line a then through line b and then through line c. FIG. 13 (at II) shows a possible transformed input image with a target visible in the left third. A pattern which the convolution search may detect the reference target matching at position was marked with a lightning shape in line b of FIG. 13 (at III). Optionally, more sophisticated search strategies may take previously found positions into account the search may begin and hover around near the position an earlier search found the reference target matching at for fastest and low performance consuming search.

The camera is disposed at a rear portion of the vehicle and has a field of view generally rearward of the vehicle. The camera may capture image data for use by the trailer backup assist system of the present invention, and may also capture image data for use by other vehicle systems, such as a rear backup assist system or a surround view system or the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and published on Dec. 24, 2014 as International Publication No. WO 2014/204794, and/or U.S. patent application Ser. No. 14/573,307, filed Dec. 17, 2014, and published on Jun. 25, 2015 as U.S. Patent Publication No. US-2015/0179074; Ser. No. 14/573,306, filed Dec. 17, 2014, now U.S. Pat. No. 10,095,935; Ser. No. 14/572,018, filed Dec. 16, 2014, and published on Jun. 25, 2015 as U.S. Patent Publication No. 2015/0176596; Ser. No. 14/572,017, filed Dec. 16, 2014, and published Jun. 25, 2015 as U.S. Patent Publication No. 2015/0175072; Ser. No. 14/568,177, filed Dec. 12, 2014, now U.S. Pat. No. 9,988,047; Ser. No. 14/561,794, filed Dec. 5, 2014, now U.S. Pat. No. 9,499,139; Ser. No. 14/558,981, filed Dec. 3, 2014, and published Jun. 4, 2015 as U.S. Patent Publication No. 2015/0156383; Ser. No. 14/535,739, filed Nov. 7, 2014, now U.S. Pat. No. 9,451,138; Ser. No. 14/524,203, filed Oct. 27, 2014, now U.S. Pat. No. 9,457,717; Ser. No. 14/519,469, filed Oct. 21, 2014, now U.S. Pat. No. 9,881,220; Ser. No. 14/391,841, filed Oct. 10, 2014, now U.S. Pat. No. 9,751,465; Ser. No. 14/489,659, filed Sep. 18, 2014, and published on Apr. 2, 2015 as U.S. Patent Publication No. 2015/0092042; Ser. No. 14/446,099, filed Aug. 22, 2014, now U.S. Pat. No. 9,343,245; Ser. No. 14/377,940, filed Aug. 11, 2014, and published Jan. 22, 2015 as U.S. Patent Publication No. US-2015/0022665; Ser. No. 14/377,939, filed Aug. 11, 2014, now U.S. Pat. No. 9,871,971; Ser. No. 14/456,164, filed Aug. 11, 2014, now U.S. Pat. No. 9,619,716; Ser. No. 14/456,163, filed Aug. 11, 2014, and published on Feb. 12, 2015 as U.S. Patent Publication No. 2015/0042807; Ser. No. 14/456,162, filed Aug. 11, 2014, and published on Feb. 12, 2015 as U.S. Patent Publication No. US-2015/0042806; Ser. No. 14/373,501, filed Jul. 21, 2014, and published on Jan. 29, 2015 as U.S. Patent Publication No. US-2015/0028781; Ser. No. 14/372,524, filed Jul. 16, 2014, and published on Jan. 22, 2015 as U.S. Patent Publication No. US-2015/0022664; Ser. No. 14/324,696, filed Jul. 7, 2014, now U.S. Pat. No. 9,701,258; Ser. No. 14/369,229, filed Jun. 27, 2014, now U.S. Pat. No. 9,491,342; Ser. No. 14/316,940, filed Jun. 27, 2014, and published on Jan. 8, 2015 as U.S. Patent Publication No. 2015/0009010; Ser. No. 14/316,939, filed Jun. 27, 2014, and published on Jan. 1, 2015 as U.S. Patent Publication No. 2015/0002670; Ser. No. 14/303,696, filed Jun. 13, 2014, now U.S. Pat. No. 9,609,757; Ser. No. 14/303,695, filed Jun. 13, 2014, and published Dec. 25, 2014 as U.S. Patent Publication No. US-2014-0375476; Ser. No. 14/303,694, filed Jun. 13, 2014, now U.S. Pat. No. 9,260,095; Ser. No. 14/303,693, filed Jun. 13, 2014, and published Dec. 18, 2014 as U.S. Patent Publication No. US-2014/0368654; Ser. No. 14/297,663, filed Jun. 6, 2014, and published Dec. 11, 2014 as U.S. Patent Publication No. US-2014/0362209; Ser. No. 14/290,028, filed May 29, 2014, now U.S. Pat. No. 9,800,794; Ser. No. 14/290,026, filed May 29, 2014, now U.S. Pat. No. 9,476,398; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published Nov. 6, 2014 as U.S. Patent Publication No. US-2014/0327772; Ser. No. 14/264,443, filed Apr. 29, 2014, and published Oct. 30, 2014 as U.S. Patent Publication No. US-2014/0320636; Ser. No. 14/354,675, filed Apr. 28, 2014, now U.S. Pat. No. 9,580,013; Ser. No. 14/248,602, filed Apr.

9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Patent Publication No. US-2014/0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, and published on Sep. 4, 2014 as U.S. Patent Publication No. US-2014/0247352; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Patent Publication No. US-2014/0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Patent Publication No. US-2014/0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Patent Publication No. US-2014/0168437; Ser. No. 14/098,817, filed Dec. 6, 2013, and published on Jun. 19, 2014 as U.S. Patent Publication No. US-2014/0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication No. US-2014/0025240; Ser. No. 13/942,753, filed Jul. 16, 2013, and published Jan. 30, 2014 as U.S. Patent Publication No. 2014/0028852; Ser. No. 13/927,680, filed Jun. 26, 2013, and published Jan. 2, 2014 as U.S. Patent Publication No. US-2014/0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published on Aug. 29, 2013 as U.S. Patent Publication No. 2013/0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Patent Publication No. US-2013/0278769; Ser. No. 13/847,815, filed Mar. 20, 2013, and published Oct. 31, 2013 as U.S. Patent Publication No. 2013/0286193; Ser. No. 13/800,697, filed Mar. 13, 2013, and published Oct. 3, 2013 as U.S. Patent Publication No. 2013/0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Patent Publication No. 2013/0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published on Jan. 3, 2013 as U.S. Patent Publication No. US-2013/0002873, which are all hereby incorporated herein by reference in their entireties. The camera or cameras may comprise any suitable cameras or imaging sensors or camera modules, and may utilize aspects of the cameras or sensors described in U.S. patent application Ser. No. 13/260,400, filed Sep. 26, 2011, now U.S. Pat. No. 8,542,451, and/or U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498, 620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008, and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer backup assist system, said vehicular trailer backup assist system comprising:
   a camera disposed at a vehicle and having a field of view exterior and at least rearward of the vehicle;
   wherein, with a trailer hitched at a trailer hitch of the vehicle, the field of view of said camera at least partially encompasses the trailer;
   a control comprising an image processor that processes image data captured by said camera;
   wherein image data captured by said camera is processed at said control;
   a display screen disposed in the vehicle and viewable by a driver of the vehicle when operating the vehicle, wherein, during a reversing maneuver of the vehicle and trailer, said display screen displays video images derived at least in part from image data captured by said camera;
   wherein, during the reversing maneuver of the vehicle and trailer, said vehicular trailer backup assist system electronically overlays a plurality of zones over the video images displayed at said display screen, and wherein each individual zone of the overlayed plurality of zones is indicative of a respective individual region rearward of the vehicle and trailer;
   a user input operable by a driver of the vehicle, wherein the driver operates the user input to select an individual zone of the overlayed plurality of zones as a zone of travel for the trailer during the reversing maneuver of the vehicle;
   wherein, responsive to the selected zone of travel for the trailer, said control controls, during the reversing maneuver of the vehicle and trailer, steering of the vehicle to steer the vehicle such that, during the reversing maneuver, the trailer travels towards the respective individual region displayed in the displayed video images that is encompassed by the overlay of the selected zone of travel;
   wherein said control controls steering of the vehicle to move the trailer relative to the overlayed plurality of zones in a manner that guides the trailer towards the respective individual region that is encompassed by the overlay of the selected zone of travel during reversing of the vehicle and trailer; and
   wherein, during the reversing maneuver of the vehicle and trailer, the driver of the vehicle manually adjusts steering of the vehicle to more accurately steer the vehicle towards a target location within the respective individual region that is encompassed by the overlay of the selected zone of travel.

2. The vehicular trailer backup assist system of claim 1, wherein said control, responsive at least in part to processing at said control of image data captured by said camera, determines a trailer angle of the trailer relative to a longitudinal axis of the vehicle.

3. The vehicular trailer backup assist system of claim 2, wherein said control, via processing at said control of image data captured by said camera, determines the trailer angle of the trailer via determining a location of a target disposed at the trailer.

4. The vehicular trailer backup assist system of claim 3, wherein image data captured by said camera is demorphed by processing at said control before said control determines the location of the target disposed at the trailer.

5. The vehicular trailer backup assist system of claim 4, wherein said image data, when demorphed by processing at said control, results in straightened lines in regions of image data captured by said camera.

6. The vehicular trailer backup assist system of claim 1, wherein said control, via processing at said control of image data captured by said camera, determines an orientation of the trailer relative to a longitudinal axis of the vehicle via determining a location of a target disposed at the trailer.

7. The vehicular trailer backup assist system of claim 6, wherein, with the trailer hitched at the trailer hitch of the vehicle, said control determines a zone of the overlayed plurality of zones where the target disposed at the trailer is located, and wherein steering of the vehicle is controlled responsive at least in part to the determined zone.

8. The vehicular trailer backup assist system of claim 7, wherein the overlayed plurality of zones comprises an overlay of a plurality of pie-shaped zones electronically overlayed over the video images displayed at said display screen so as to appear over the displayed video images and partially surrounding the trailer hitch of the vehicle.

9. The vehicular trailer backup assist system of claim 8, wherein said control controls steering of the vehicle to maintain the target disposed at the trailer in the selected zone of travel.

10. The vehicular trailer backup assist system of claim 1, wherein the overlayed plurality of zones comprises an overlay of a plurality of pie-shaped zones electronically overlayed over the video images displayed at said display screen so as to appear over the displayed video images and partially surrounding the trailer hitch of the vehicle.

11. The vehicular trailer backup assist system of claim 10, wherein said control controls steering of the vehicle to maintain a portion of the trailer in the selected zone of travel during reversing of the vehicle and trailer.

12. A vehicular trailer backup assist system, said vehicular trailer backup assist system comprising:
   a camera disposed at a vehicle and having a field of view exterior and at least rearward of the vehicle;
   wherein, with a trailer hitched at a trailer hitch of the vehicle, the field of view of said camera at least partially encompasses the trailer;
   a control comprising an image processor that processes image data captured by said camera;
   wherein image data captured by said camera is processed at said control;
   a display screen disposed in the vehicle and viewable by a driver of the vehicle when operating the vehicle, wherein, during a reversing maneuver of the vehicle and trailer, said display screen displays video images derived at least in part from image data captured by said camera;
   wherein, during the reversing maneuver of the vehicle and trailer, said vehicular trailer backup assist system electronically overlays a plurality of zones over the video images displayed at said display screen, and wherein each individual zone of the overlayed plurality of zones is indicative of a respective individual region rearward of the vehicle and trailer;
   wherein the overlayed plurality of zones comprises an overlay of a plurality of pie-shaped zones electronically overlayed over the video images displayed at said display screen so as to appear over the displayed video images and partially surrounding the trailer hitch of the vehicle;
   wherein said control, via processing at said control of image data captured by said camera, determines an orientation of the trailer relative to a longitudinal axis of the vehicle via determining a location of a target disposed at the trailer;

a user input operable by a driver of the vehicle, wherein the driver operates the user input to select an individual zone of the overlayed plurality of zones as a zone of travel for the trailer during the reversing maneuver of the vehicle;

wherein, responsive to the selected zone of travel for the trailer, said control controls, during the reversing maneuver of the vehicle and trailer, steering of the vehicle to steer the vehicle such that, during the reversing maneuver, the trailer travels towards the respective individual region displayed in the displayed video images that is encompassed by the overlay of the selected zone of travel;

wherein said control controls steering of the vehicle to move the trailer relative to the overlayed plurality of zones in a manner that guides the trailer towards the respective individual region that is encompassed by the overlay of the selected zone of travel during reversing of the vehicle and trailer; and wherein, during the reversing maneuver of the vehicle and trailer, the driver of the vehicle manually adjusts steering of the vehicle to more accurately steer the vehicle towards a target location within the respective individual region that is encompassed by the overlay of the selected zone of travel.

13. The vehicular trailer backup assist system of claim 12, wherein image data captured by said camera is demorphed by processing at said control before said control determines the location of the target disposed at the trailer.

14. The vehicular trailer backup assist system of claim 13, wherein said image data, when demorphed by processing at said control, results in straightened lines in regions of image data captured by said camera.

15. The vehicular trailer backup assist system of claim 12, wherein, with the trailer hitched at the trailer hitch of the vehicle, said control determines a zone of the overlayed plurality of zones where the target disposed at the trailer is located, and wherein steering of the vehicle is controlled responsive at least in part to the determined zone.

16. The vehicular trailer backup assist system of claim 15, wherein said control controls steering of the vehicle to maintain the target disposed at the trailer in the selected zone of travel.

17. A vehicular trailer backup assist system, said vehicular trailer backup assist system comprising:

a camera disposed at a vehicle and having a field of view exterior and at least rearward of the vehicle;

wherein, with a trailer hitched at a trailer hitch of the vehicle, the field of view of said camera at least partially encompasses the trailer;

a control comprising an image processor that processes image data captured by said camera;

wherein image data captured by said camera is processed at said control;

a display screen disposed in the vehicle and viewable by a driver of the vehicle when operating the vehicle, wherein, during a reversing maneuver of the vehicle and trailer, said display screen displays video images derived at least in part from image data captured by said camera;

wherein, during the reversing maneuver of the vehicle and trailer, said vehicular trailer backup assist system electronically overlays a plurality of zones over the video images displayed at said display screen, and wherein each individual zone of the overlayed plurality of zones is indicative of a respective individual region rearward of the vehicle and trailer;

wherein said control, via processing at said control of image data captured by said camera, determines an orientation of the trailer relative to a longitudinal axis of the vehicle via determining a location of a target disposed at the trailer;

wherein image data captured by said camera is demorphed by processing at said control before said control determines the location of the target disposed at the trailer;

a user input operable by a driver of the vehicle, wherein the driver operates the user input to select an individual zone of the overlayed plurality of zones as a zone of travel for the trailer during the reversing maneuver of the vehicle;

wherein, responsive to the selected zone of travel for the trailer, said control controls, during the reversing maneuver of the vehicle and trailer, steering of the vehicle to steer the vehicle such that, during the reversing maneuver, the trailer travels towards the respective individual region displayed in the displayed video images that is encompassed by the overlay of the selected zone of travel;

wherein said control controls steering of the vehicle to move the trailer relative to the overlayed plurality of zones in a manner that guides the trailer towards the respective individual region that is encompassed by the overlay of the selected zone of travel during reversing of the vehicle and trailer;

wherein, with the trailer hitched at the trailer hitch of the vehicle, said control determines a zone of the overlayed plurality of zones where the target disposed at the trailer is located, and wherein steering of the vehicle is controlled responsive at least in part to the determined zone where the target disposed at the trailer is located; and wherein, during the reversing maneuver of the vehicle and trailer, the driver of the vehicle manually adjusts steering of the vehicle to more accurately steer the vehicle towards a target location within the respective individual region that is encompassed by the overlay of the selected zone of travel.

18. The vehicular trailer backup assist system of claim 17, wherein said image data, when demorphed by processing at said control, results in straightened lines in regions of image data captured by said camera.

19. The vehicular trailer backup assist system of claim 18, wherein the overlayed plurality of zones comprises an overlay of a plurality of pie-shaped zones electronically overlayed over the video images displayed at said display screen so as to appear over the displayed video images and partially surrounding the trailer hitch of the vehicle.

20. The vehicular trailer backup assist system of claim 19, wherein said control controls steering of the vehicle to maintain the target disposed at the trailer in the selected zone of travel.

\* \* \* \* \*